Feb. 9, 1971 W. MUELLER 3,561,278
MALTESE-CROSS TRANSMISSION OR DRIVE ARRANGEMENT
Filed March 3, 1969 2 Sheets-Sheet 1

INVENTOR,
WERNER MUELLER
BY Jacobi & Davidson
ATTORNEYS

United States Patent Office 3,561,278
Patented Feb. 9, 1971

3,561,278
MALTESE-CROSS TRANSMISSION OR DRIVE ARRANGEMENT
Werner Mueller, Aarau, Switzerland, assignor to Contraves AG, Zurich, Switzerland, a corporation of Switzerland
Filed Mar. 3, 1969, Ser. No. 803,679
Claims priority, application Switzerland, Mar. 5, 1968, 3,254/68
Int. Cl. F16h 27/00
U.S. Cl. 74—89    7 Claims

ABSTRACT OF THE DISCLOSURE

There is disclosed a Maltese-cross drive arrangement which can be switched in and out incorporating a continuously driven drive rotor having diametrically opposed bores in which there are arranged magnetic entrainment pin members engageable with a stepwise indexable driven element for stepwise displacement thereof. The entrainment pin members can be selectively controlled for movement from an ineffectual rest position into an operable working position where such operably engage with said driven element. According to the invention, the drive rotor and the axially displaceable entrainment pin members form components of a ferromagnetic work circuit which additionally includes first and second pole shoes, one of the pole shoes having a predetermined configured guide surface. Through appropriate operation of the ferromagnetic work circuit each entrainment pin member can be selectively displaced from its rest position into its working position where it engages with the driven element for stepwise displacement of the latter.

BACKGROUND OF THE INVENTION

The present invention relates to an improved Maltese-cross transmission or drive which can be switched-in and switched-out, and is of the type incorporating a drive rotor capable of being motor driven for continuous rotation. This drive rotor carries a respective magnetic entrainment pin member arranged in each of two diametrically situated opposed bores having substantially parallel axes, these entrainment pin members being engageable with spaced slots of a stepwise indexable driven element for displacing or advancing the latter. Each of these entrainment pin members is moveable from an ineffectual rest position into an operable working position and displaceable back into the aforesaid rest position out of engagement with the previously mentioned slots.

The driven or power-takeoff element may be a cross-slotted disc which should be stepwise or incrementally rotated about its axis and provided with radially directed slots, or a beam with parallel slots which can be linearly displaced within a limited range through the use of two contrarotating Maltese-drive arrangements.

If electromagnetic displacement mechanisms should be used for Maltese-cross drives or transmissions of known construction which can be switched-in and switched-out, then such generally always have the drawback that the entrainment means must be displaced from a thrown-in or retracted position, in which it provides a relatively large air gap in the corresponding magnetic work circuit, against the force of a return spring by a correspondingly strong magnetic flux induced across this air gap, quickly into a position in which the air gap is minimum, yet the tension of the return spring, however, maximum. This known generally conventional principle for electromagnetic displacement mechanisms is, however, very unfavorable from the energy standpoint.

SUMMARY OF THE INVENTION

Accordingly, it is a primary object of the present invention to provide a new and improved Geneva or Maltese-cross transmission or drive arrangement which effectively overcomes the aforementioned drawbacks.

Another, more specific object of the present invention relates to an improved Maltese-cross transmission or drive arrangement which provides considerable improvements over the previously mentioned prior art constructions in that, the energy required for displacing the entrainment members to and fro is essentially obtained from the motor driving the drive rotor, whereas the control mechanism need only put forth a small control output.

Still a further significant object of the present invention relates to an improved Maltese-cross transmission or drive arrangement which is relatively simple in construction, economical to manufacture, extremely efficient in operation, not readily subject to breakdown, and has relatively small energy requirements for its operation.

Now, in order to implement these and still further objects of the invention which will become more readily apparent as the description proceeds, the invention contemplates that the drive rotor and the entrainment pin members displaceable axially therein form components of a ferromagnetic work circuit which can be switched-in and switched-out. This ferromagnetic work circuit further includes a first pole shoe possessing a substantially cylindrical fitting surface which encompasses or surrounds the drive rotor along a portion of its outer surface or jacket, and a second pole shoe provided with a guide surface in front of the free head ends of such entrainment pin members. This guide surface is substantially cylindrically curved in a direction towards an end surface plane of the drive rotor from a diametric plane of such drive rotor about an axis which is arranged transverse to the axis of the drive rotor. The stepwise indexable driven elements extends from this diametric plane towards the opposite side of the guide surface, and the inlet openings of the slots of the indexable driven element are arranged substantially in the diametric plane. Each of the entrainment pin members during its phase of movement while its head end is located in its rest position at the largest possible spacing or distance from the diametric plane, bears against the cylindrical curved guide surface of the second pole shoe when the magnetic flux appears in the magnetic work circuit. The magnetic force is sufficient to retain each such entrainment pin member against this guide surface, and, therefore, during its movement towards the diametric plane is displaced into the work position, whereby it engages with a properly positioned slot of the driven element and entrains such driven element through one indexing step during the next half of rotation of the driven rotor. Furthermore, each entrainment pin member which was previously in engagement with a slot of the driven element, after passing through the diametral plane, is pushed from the guide surface of the second pole shoe back into its rest position where it remains as long as the magnetic flux in the ferromagnetic work circuit is not switched-in during the corresponding phase.

BRIEF DESCRIPTION OF THE DRAWINGS

The invention will be better understood, the objects other than those set forth above, will become apparent, when consideration is given to the following detailed description thereof. Such description makes reference to the annexed drawings, employing substantially the same reference characters or numerals throughout the various embodiments to indicate the same or analogous elements, and wherein:

FIG. 1 is a sectional view of a first embodiment of

Figure 1:
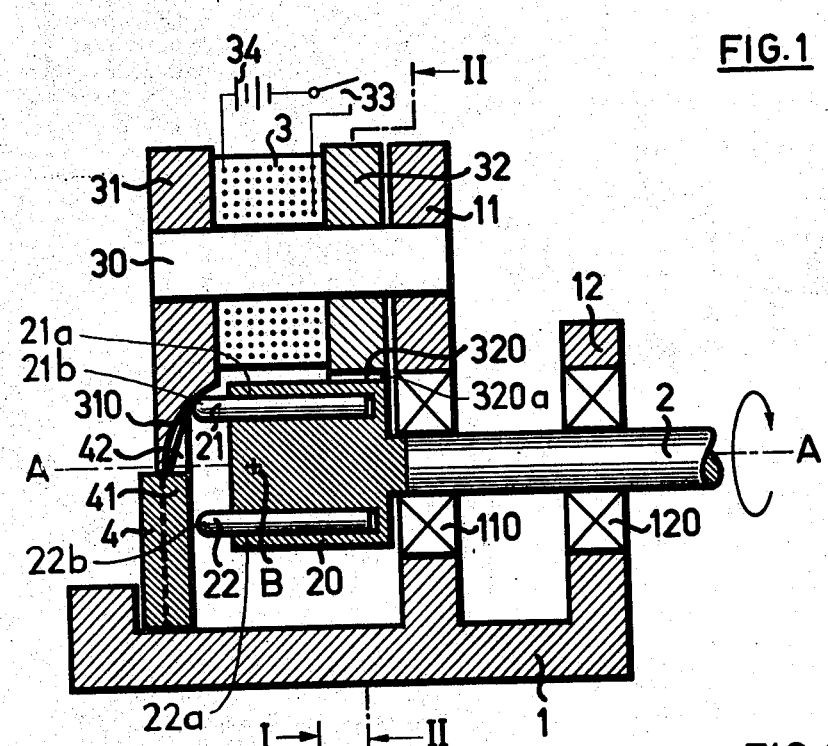
Figure 3:
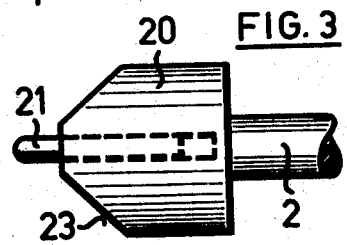
Figure 2:
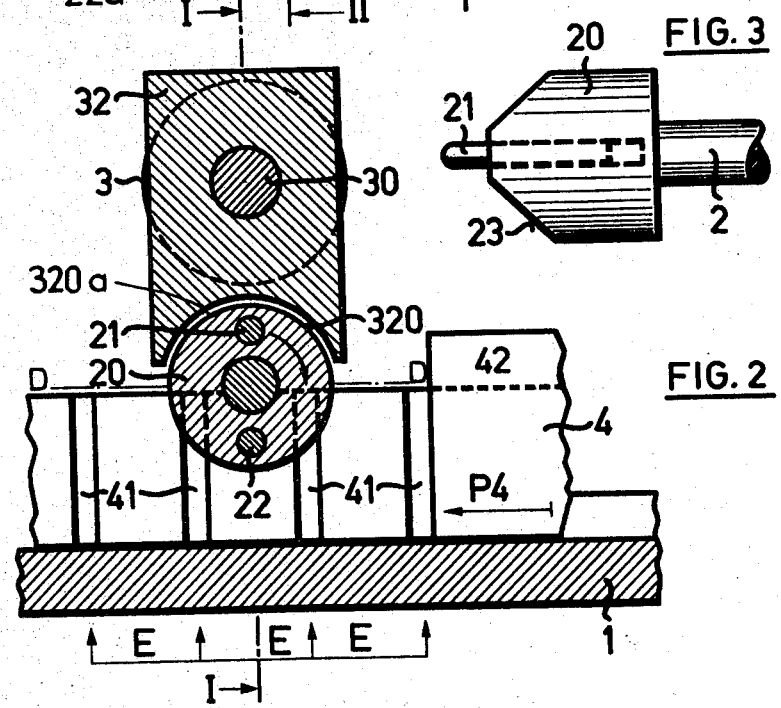
Figure 4:
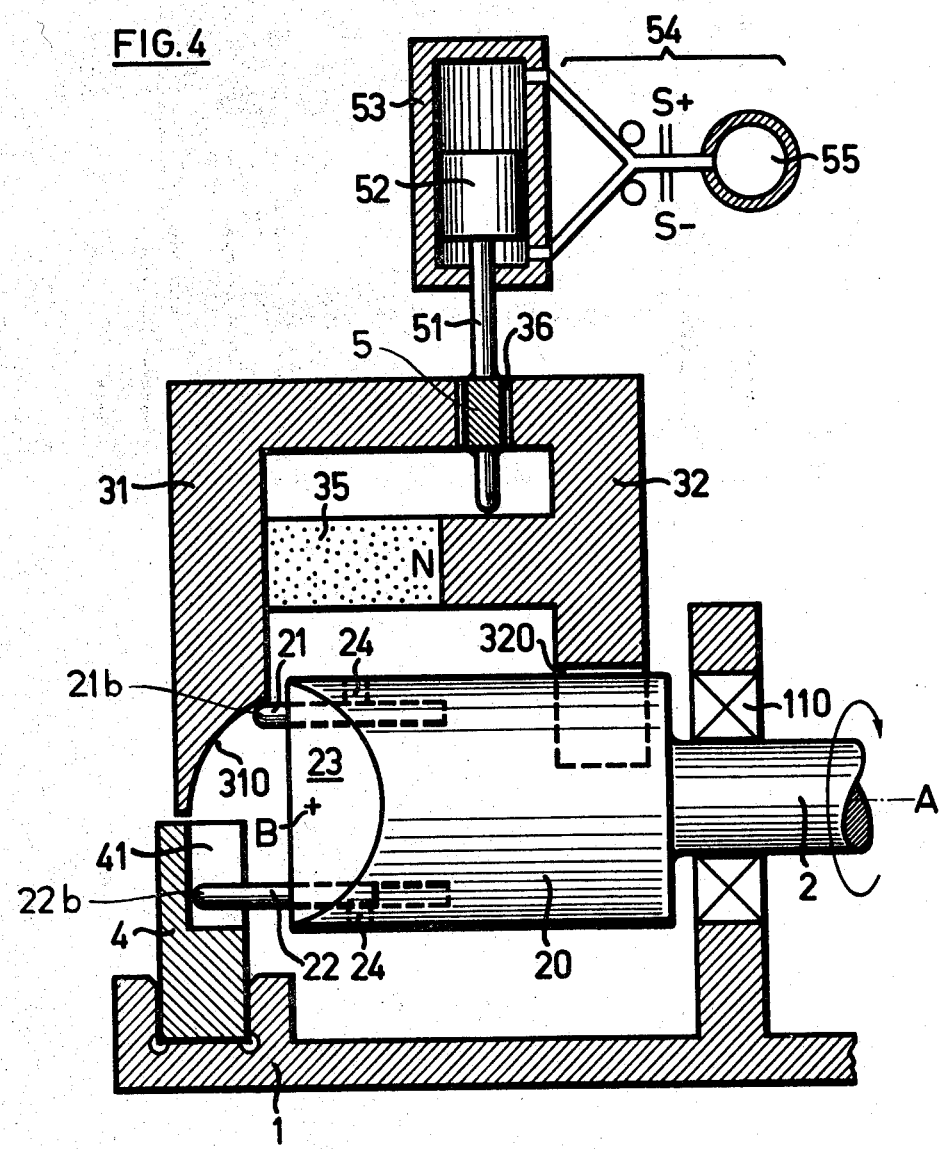

Maltese-cross transmission or drive arrangement, taken substantially along the line I—I of FIG. 2;

FIG. 2 is a sectional view of the arrangement shown in FIG. 1 taken along the lines II—II thereof, specifically depicting an embodiment of Maltese-cross drive arrangement equipped with axially directed and displaceable entrainment bolt members in a rotating drive element and with an electromagnetic system for generating the contact force required for the entrainment bolt members;

FIG. 3 is a fragmentary front view of the drive element used in the arrangement of FIGS. 1 and 2; and FIG. 4 is a form of Maltese-cross drive arrangement somewhat different from that shown in FIGS. 1–3, wherein the difference primarily resides in the arrangement for switching-in and switching-out the magnetic lines of force for displacing or throwing out the entrainment bolt members.

DESCRIPTION OF THE PREFERRED EMBODIMENTS

Describing now the drawings, in the arrangement shown in FIGS. 1–3 there is provided a base or bottom plate 1 having a pair of upright members or stands 11 and 12 in which there are mounted aligned confronting rotary bearing means 110 and 120 for a shaft member 2. This shaft member 2 carries a drive rotor 20 of substantially cylindrical configuration. Two entrainment bolt members 21 and 22 are displaceably mounted in axially parallel bores 21a and 22a, respectively, provided at the drive rotor 20. It is contemplated for the purpose of continuously driving the drive rotor 20 that the shaft member 2 be operatively coupled with a suitable drive motor, which for convenience in illustration has not been depicted. The drive rotor 20 and the entrainment bolt members 21 and 22 which are displaceable in axially parallel fashion therein, in the exemplary embodiment depicted, consist of ferromagnetic material. They form a portion of a magnetic work circuit which, apart from the drive rotor 20 and the entrainment bolt members 21 and 22, is further constituted by a core 30 and excitation coil 3 and two pole shoes 31 and 32. The pole shoe 31 forms a cylindrically configured guide surface 310 about the axis B which is oriented transverse to the axis of rotation A—A of the drive rotor or element 20. The other pole shoe 32 surrounds the right end of the drive rotor 20 by means of a surface 320 which is formed to be coaxial with respect to the rotational axis A—A and with an air gap 320a which is as narrow as possible.

The excitation coil 3 is electrically coupled with a suitable source of direct-current 34 upon closing a switch member 33. This should always occur then or shortly prior to the time when one of the entrainment bolt members, such as bolt member 21 is in its illustrated engaged or pushed-in position, that is, in its upper dead-center position bears with its rounded head portion 21b against the cylindrical guide surface 310 of the pole shoe 31.

Since in this condition the air gap in the magnetic work circuit is minimal, a slight excitation of the coil 3 is also sufficient to maintain the corresponding entrainment bolt member 21, during further rotation about the axis A—A, pressed against the guide surface 310. In other words, during the next quarter-rotation about the axis A—A, such entrainment bolt member will be pulled-out of the left-end face of the drive rotor 20 parallel to the aforesaid rotational axis A—A, and thus, placed in the advanced or drawn-out work position in which it engages with one of the slots 41 of the slide plate 4 forming the driven element during the next half-rotation about the axis A—A. Consequently, this bolt member 21 displaces the slide plate 4 in the direction of the arrow P4 through one indexing step E. In the last quarter-rotation about the axis A—A after passing through the diametric plane D–A–D, the advanced or thrown-out entrainment bolt member 21 is again pushed back towards the right of FIG. 1 by the guide surface 310 of the pole shoe 31. If, after reaching the illustrated phase or position, the magnetic coil 3 is not excited, because then for instance the switch 32 is open, then the entrainment bolt member 21 remains in its retracted or thrown-in position during the next rotation. In other words, it does not engage with one of the slots 41 of the slide plate 4, and, thus, does not bring about any indexing step of such slide plate 4. It the switch member 33 is continuously closed, then during each complete rotation it is possible to bring about two displacement or indexing steps E of the slide plate 4, the second in each case being performed by the entrainment bolt member 22 provided that the switch member 33 is closed, and when this entrainment bolt member 22 has assumed the position depicted for the other entrainment bolt member 21. No precise or high requirements are placed upon the exactness in time for switching-in the excitation current for the coil 3. It is sufficient if the coil 3 is subjected to current flow at some time during the last half-rotation prior to reaching the upper dead-center position of an entrainment bolt member, provided that such excitation is smaller than that it tends to attract or draw the entrainment bolt member from its retracted position against the guide surface 310 of the pole shoe 31 via the still large air gap in the last phase prior to reaching the upper dead-center position of the entrainment bolt member 21 illustrated in FIGS. 1 and 2.

In order to prevent damaging stray of the magnetic flux the drive rotor 20 as best shown by referring to FIG. 3, is advantageously provided with beveled or inclined surfaces 23.

In FIG. 1 and to the right of FIG. 2 there is provided at the slide rail or plate member 4 a wedge-shaped deflector or displacement cam 42. This cam 42 serves to prevent advancement of an entrainment bolt member which does not find available any slot 41 for displacing the slide rail 4, in other words, displaces such entrainment bolt member back into its rest position at the proper time.

The embodiment depicted in FIG. 4 essentially corresponds to that shown in FIGS. 1–3, inclusive. It will be understood that similarly constructed and similarly functioning components have been conveniently designated with the same reference numerals as used in conjunction with the description of the arrangement of FIGS. 1–3. In this instance, instead of employing a magnetic coil 3 there is provided at the ferromagnetic work circuit a permanent magnet 35 and the pole shoes 31 and 32 form a magnetic shunt circuit with an air gap 36. This shunt circuit-air gap 36 can be closed by a soft iron piece 5, or can be opened by pulling out this soft iron piece 5. This causes, in the first mentioned situation, that the entrainment bolt members 21 and 22, which are sufficiently secured by the associated braking body member 24 against undesired displacement, remain pushed-in during further rotation of the drive rotor 20, or in the second situation mentioned above, remain in contact with the guide surface 310, and thereby are advanced in axial direction for engagement with one of the slots 41 of the slide rail or plate 4 and finally again pushed in. For moving the soft iron piece 5 in and out relative to the shunt circuit-air gap 36, this soft iron piece 5 is mounted upon a displaceable bolt member 51 which is, in turn, operably coupled with a piston member 52 reciprocating in a cylinder 53. With the help of a pneumatic control circuit 54, through the use of pneumatic control signals S+ and S—, the piston member 52 can in known manner alternatingly be impinged at one or the other face with compressed air or other suitable pressurized medium delivered from the supply conduit or line 55.

It should be apparent from the foregoing detailed description, that the objects set forth at the outset to the specification have been successfully achieved.

What is claimed is:

1. A Maltese-cross arrangement which can be switched-in and switched-out, comprising a drive rotor capable of being motor driven for continuous rotation, a stepwise indexable driven element provided with a number of spaced slots having inlet openings thereto, said drive rotor being provided with a pair of diametrically situated opposed bores having substantially parallel axes, a respective magnetic entrainment pin member having a free head end and arranged in each of said bores and engageable with said spaced slots of said stepwise indexable driven element for stepwise displacement of the latter, each of said entrainment pin members being movable from an ineffectual rest position into an operable working position and returnable back into said rest position out of engagement with said slots, said drive rotor and the therein arranged axially displaceable entrainment pin members forming components of a ferromagnetic work circuit which can be switched-in and switched-out, said ferromagnetic work circuit further including a first pole shoe possessing a substantially cylindrical fitting surface surrounding said drive rotor along a portion of its outer surface, a second pole shoe provided with a guide surface in front of the free head ends of said entrainment pin members, said guide surface being substantially cylindrically curved in a direction towards an end surface of said drive rotor from a diametric plane of the drive rotor and about an axis which is arranged substantially transverse to the axis of said drive rotor, said inlet openings of said slots lying substantially in said diametric plane, said stepwise indexable driven element extending from said diametric plane towards the opposite side of said guide surface, each of said entrainment pin members during its phase of movement while its free head end is located in its rest position at the largest possible distance from said diametric plane bearing against said cylindrical curved guide surface of said second pole shoe when said magnetic flux appears in said ferromagnetic work circuit, the magnetic force being sufficient to retain each such entrainment pin member against said guide surface and therefore during its movement towards said diametric plane is displaced into said working position, whereby it engages with a properly positioned slot of said driven element and entrains such driven element through one indexing step during the next half rotation of said drive rotor, and wherein each entrainment pin member which was previously in engagement with a slot of said driven element after passing through said diametric plane is pushed from said guide surface of said second pole shoe back into its rest position where it remains as long as the magnetic flux in the ferromagnetic work circuit is not switched-in during the corresponding operational phase.

2. A Maltese-cross drive arrangement as defined in claim 1, wherein said end surface of said drive rotor from which protrude said free head ends of both entrainment pin members is provided with inclined surface means for preventing straying of the magnetic flux.

3. A Maltese-cross drive arrangement as defined in claim 1, wherein said stepwise indexable driven element is constructed in the form of a linear substantially rail member which can be displaced within a limited range, deflecting means for displacing said entrainment pin members out of their work position into said rest position, said deflecting means being provided at said rail member externally of the region provided with slots and protruding past said diametric plane.

4. A Maltese-cross drive arrangement as defined in claim 1, further including means for switching-in and switching-out the magnetic flux in said ferromagnetic work circuit, said switching means incorporating an electromagnetic coil located in an excitation current circuit and capable of being energized.

5. A Maltese-cross drive arrangement as defined in claim 1, further including means for switching-in and switching-out said magnetic flux of said ferromagnetic work circuit, said switching means incorporating an air gap provided in a ferromagnetic shunt circuit of a permanent magnet circuit, a controllable actuation device for bridging or opening said air gap.

6. A Maltese-cross drive arrangement which can be switched-in and switched-out, comprising a drive rotor capable of being motor driven for continuous rotation, a stepwise indexable driven element provided with a number of spaced slots, said drive rotor being provided with a pair of diametrically situated opposed bores having substantially parallel axes, a respective magnetic entrainment pin member having a free head end and arranged in each of said bores and engageable with said spaced slots of said stepwise indexable driven element for stepwise displacement of the latter, each of said entrainment pin members being movable from an ineffectual rest position into an operable working position engaging one of said spaced slots and returnable back into said rest position out of engagement with said slot, said drive rotor and the therein arranged axially displaceable entrainment pin members forming components of a ferromagnetic work circuit which can be switched-in and switched-out, said ferromagnetic work circuit further including a first pole shoe possessing a surface surrounding said drive rotor along a portion of its outer surface, a second pole shoe provided with a guide surface in front of the free head ends of said enerainment pin members, said guide surface being substantially cylindrically curved in a direction towards an end surface of said drive rotor from a diametric plane of the drive rotor and about and axis which is arranged substantially transverse to the axis of said drive rotor, each of said entrainment pin members during its phase of movement while its free head end is located in its rest position at approximately the largest possible distance from said diametric plane bearing against said cylindrical curved guide surface of said second pole shoe when said magnetic flux appears in said ferromagnetic work circuit, the magnetic force being sufficient to retain each such entrainment pin member against said guide surface and therefore during its movement towards said diametic plane is displaced into said working position, whereby it engages with a properly positioned slot of said driven element and entrains such driven element through one indexing step during the next half rotation of said drive rotor, and wherein each entrainment pin member which was previously in engagement with a slot of said driven element after passing through said diametric plane is pushed from said guide surface of said second pole shoe back into its rest position where it remains as long as the magnetic flux in the ferromagnetic work circuit is not switched-in during the corresponding operational phase.

7. A magnetically controllable Maltese-cross drive arrangement comprising a continuously driven drive rotor having an axis of rotation and formed of ferromagnetic material, said drive rotor being provided with at least one ferromagnetic entrainment pin member located externally of said axis of rotation, an indexable driven member provided with slot means positioned to cooperate with said entrainment pin member, said entrainment pin member being mounted to be displaceable substantially parallel to said rotational axis from an ineffectual rest position into an operable working position engaging with a slot means of said indexable driven member, said entrainment pin member possessing a free head end portion protruding out of said drive rotor, a selectively controllable ferromagnetic work circuit means including selectively energizable magnet means incorporating a magnetic core, a first pole shoe provided for said magnetic core located substantially coaxially with respect to said magnetic core, said first pole shoe possessing a pole shoe surface forming a portion of a cylinder overlying said drive rotor in spaced relationship therefrom to form therebetween a small air gap, a second pole shoe carried by said magnetic core and provided with a pole shoe surface forming part of a cylinder which is curved about an axis extending substantially transverse to said axis of rotation of said rotor, said curved pole shoe surface being situated opposite said free head end portion of said entrainment pin member, said entrainment pin member being attracted by said curved pole shoe surface during such time that said magnet means is energized and slidably adhering thereto to assume said operable working position for engagement with a slot means of said driven element to displaceably index the latter, said curved pole shoe surface simultaneously providing an impact surface for returning said entrainment pin member into said ineffectual rest position after completion of an indexing step of said driven member when said entraiment pin member has moved out of engagement from said slot means of said indexable driven member.

References Cited
UNITED STATES PATENTS

| | | | |
|---|---|---|---|
| 2,870,647 | 1/1959 | Lauxen | 74—436 |
| 3,279,281 | 10/1966 | Anderson et al. | 74—820 |

FRED C. MATTERN, JR., Primary Examiner

F. D. SHOEMAKER, Assistant Examiner

U.S. Cl. X.R.

74—820